(12) United States Patent
McCarthy et al.

(10) Patent No.: US 9,420,317 B2
(45) Date of Patent: Aug. 16, 2016

(54) ADAPTIVE STREAMING TO MULTICAST AND CONSTRAINED-FIDELITY CONSTANT BIT RATE ENCODING

(71) Applicant: Google Technology Holdings LLC, Mountain View, CA (US)

(72) Inventors: Sean T. McCarthy, San Francisco, CA (US); Mark R. Magee, Campbell, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 15/050,198

(22) Filed: Feb. 22, 2016

(65) Prior Publication Data

US 2016/0173915 A1 Jun. 16, 2016

Related U.S. Application Data

(63) Continuation of application No. 13/623,771, filed on Sep. 20, 2012, now abandoned.

(60) Provisional application No. 61/537,057, filed on Sep. 21, 2011.

(51) Int. Cl.
| | |
|---|---|
| *G06F 15/16* | (2006.01) |
| *H04N 21/2381* | (2011.01) |
| *H04L 29/06* | (2006.01) |
| *H04N 21/6405* | (2011.01) |
| *H04N 21/239* | (2011.01) |
| *H04N 21/2385* | (2011.01) |
| *H04N 21/643* | (2011.01) |

(52) U.S. Cl.
CPC ........ *H04N 21/2381* (2013.01); *H04L 65/4076* (2013.01); *H04L 65/607* (2013.01); *H04N 21/2385* (2013.01); *H04N 21/2393* (2013.01); *H04N 21/6405* (2013.01); *H04N 21/64322* (2013.01)

(58) Field of Classification Search
None
See application file for complete search history.

(56) References Cited

U.S. PATENT DOCUMENTS

| | | | | |
|---|---|---|---|---|
| 2009/0086816 A1* | 4/2009 | Leontaris | ............. | H04N 19/176 375/240.03 |
| 2010/0325674 A1* | 12/2010 | Liu | ..................... | H04N 7/17336 725/92 |
| 2011/0082924 A1* | 4/2011 | Gopalakrishnan | .. | H04L 65/4084 709/223 |
| 2013/0163666 A1* | 6/2013 | Leontaris | .......... | H04N 19/00569 375/240.12 |
| 2014/0245364 A1* | 8/2014 | Ramakrishnan | ..... | H04N 21/458 725/97 |

* cited by examiner

*Primary Examiner* — Melvin H Pollack
*Assistant Examiner* — Oluwatosin Gidado
(74) *Attorney, Agent, or Firm* — Fenwick & West LLP

(57) ABSTRACT

This disclosure describes and adaptive bit rate encoding and distribution techniques for conserving bandwidth usage in a channel. The invention comprises, an encoder or transcoder, a video fragmenter, a video-quality analyzer that output complexity values, a streaming server, a process by which individual fragments are selected for distribution, a video-quality threshold, and, optionally a bandwidth reclamation factor. A video-quality analyzer inspects any combination of the input and output of the encoder, transcoder, or fragmenter, and produces a video-quality metric for each fragment. A fragment-selection process responds to request from a client device. If the video-quality value of the fragment requested exceeds the video-quality threshold, a different fragment having a lower vide-quality value is selected instead. Otherwise, the fragment that would have been selected is selected. In some embodiments, the video-quality threshold can be dynamically adjusted to permit varying amounts of bandwidth reclamation.

20 Claims, 17 Drawing Sheets

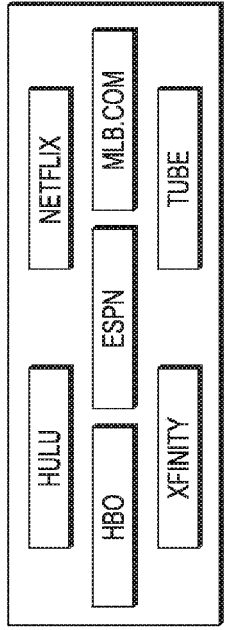
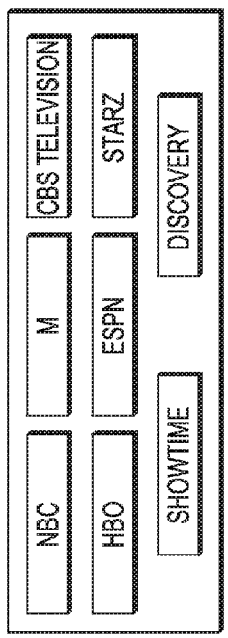
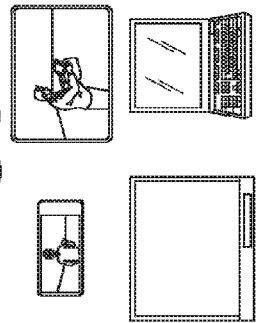
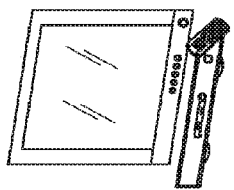
FIG. 12A
FIG. 12B

ADAPTIVE STREAMING TO MULTICAST AND CONSTRAINED-FIDELITY CONSTANT BIT RATE ENCODING

CROSS-REFERENCES TO RELATED APPLICATIONS

The present application is a continuation of U.S. application Ser. No. 13/623,771, filed Sep. 20, 2012, which claims the benefit of U.S. Provisional Application No. 61/537,057, filed Sep. 21, 2011, each of which is incorporated by reference herein in its entirety. The present application is also related to U.S. Provisional Application No. 61/537,058, filed Sep. 21, 2011 and to U.S. Provisional Application No. 61/537,054, filed Sep. 20, 2011, each of which is incorporated by reference herein in its entirety.

BACKGROUND

Adaptive Bit Rate (ABR) streaming is an emerging technology that is rapidly being adopted for commercial real-time distribution of video media and is a technique used in streaming multimedia over computer networks. While in the past most video streaming technologies utilized streaming protocols such real-time transport protocol (RTP) with real-time streaming protocol (RTSP), today's adaptive streaming technologies are almost exclusively based on hypertext transport protocol (HTTP) and designed to work efficiently over large distributed HTTP networks such as the Internet.

Streaming media content can be divided into segments having a fixed duration. ABR streaming protocols have been also been developed. ABR is a method of streaming media content where sequential HTTP progressive downloads in which a continuous media program is delivered as a series of sequential media segments or chunks.

In view of the foregoing, alternative methods of ABR are needed to better accommodate performance and distribution needs of the media content and distributors.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 12A and 12B illustrate a comparison of traditional media distribution and emerging Over-the-Top (OTT) distribution over the Internet.

DETAILED DESCRIPTION

Figure 1:
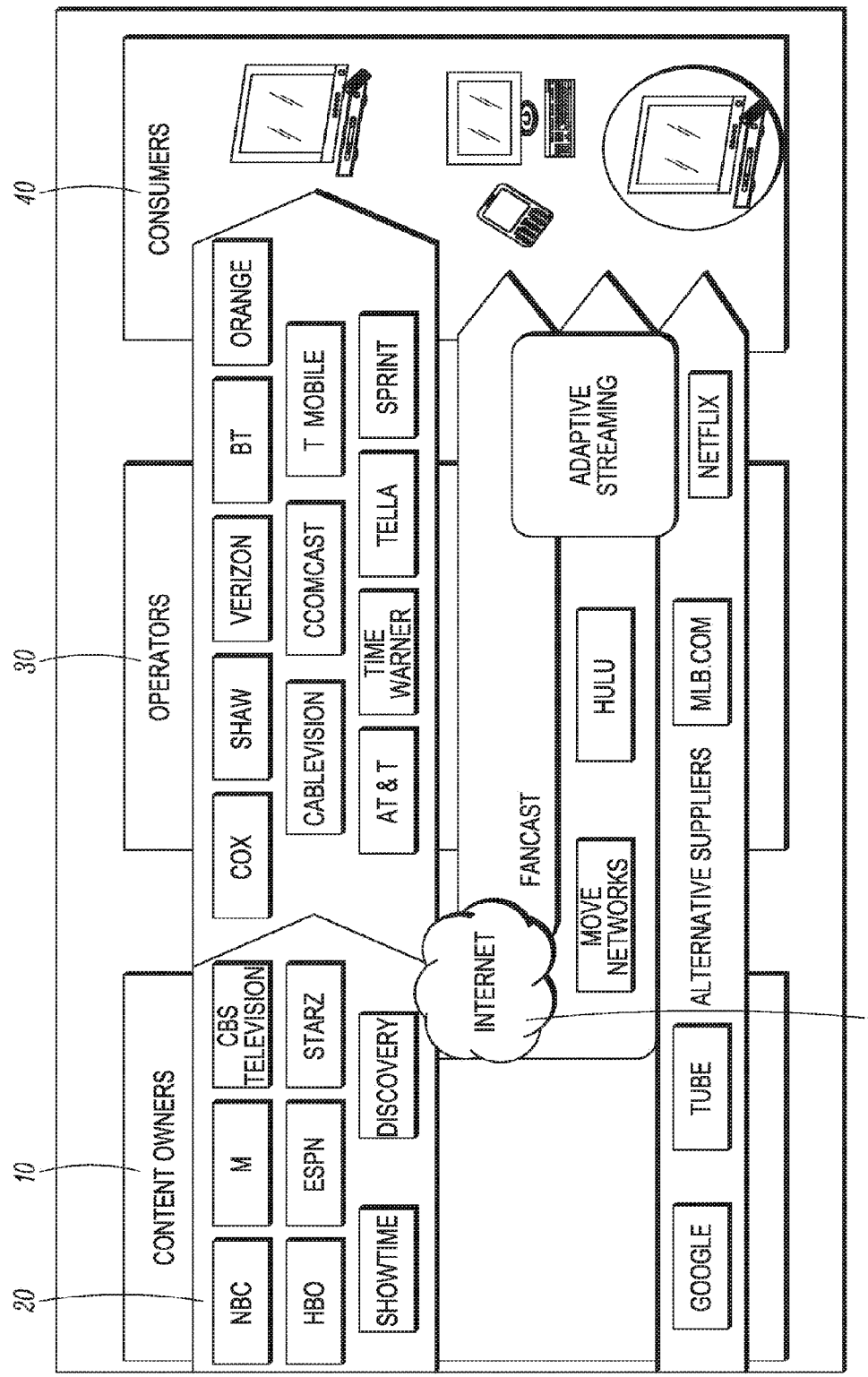
FIG. 1 is an illustration of the emerging digital media landscape for service providers and consumers.

Before describing in detail embodiments that are in accordance with the present invention, it should be observed that the embodiments reside primarily in combinations of method steps and apparatus components related to method and apparatus related to variable duration media segments for streaming media content using adaptive bit rate streaming protocols. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of variable duration media segments used in streaming media content as described herein. The non-processor circuits may include, but are not limited to, a radio receiver, a radio transmitter, signal drivers, clock circuits, power source circuits, and user input devices. As such, these functions may be interpreted as steps of a method to perform streaming media content using variable duration segments.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Described herein are techniques for providing media content to client devices. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Adaptive bit-rate streaming works by detecting a user's bandwidth and optionally other capabilities, such as CPU capacity, in real time and adjusting the quality of a video stream accordingly. It requires the use of an encoder which can encode a single source video at multiple bit rates. The client switches between streaming the different encodings depending on available resources. The result: very little buffering, fast start time and a good experience for both high-end and low-end connections.

However, as more players enter the field, a major emerging problem in adaptive streaming is that client devices are greedy. Client devices will request the maximum bit rate and quality fragments that are compatible with their current available resources thereby causing uneven, unpredictable, and fluctuating quality of experience for consumers.

FIG. 1 illustrates an overview of some ABR streaming use cases. As shown, the content owners 10 provide a wide variety of media content 20 that are accessed by consumers 40. This media content 20 includes television, cable and other audio/visual programming that is provided through traditional channels such as broadcast and cable television as well as alternative methods such as via the internet 50. The content owners and providers 10 supply the media content 20 to operators 30 such as broadcast and cable television operators as well as other types of data providers through the internet 50 and various wireless technologies. These operators provide the streaming of the media content 20 to the end consumers 30.

Disclosed herein are novel solutions for improving efficiency of bandwidth in distribution of video content by means of adaptive streaming. Also disclosed are novel approaches to addressing the problem of delivering over-the-top (OTT) video content over legacy multicast networks and set top boxes. Finally, disclosed herein are novel approaches for addressing issues of managing the Quality of Experience for video distributed over unmanaged, best-effort networks.

Figures 2A, 2B:
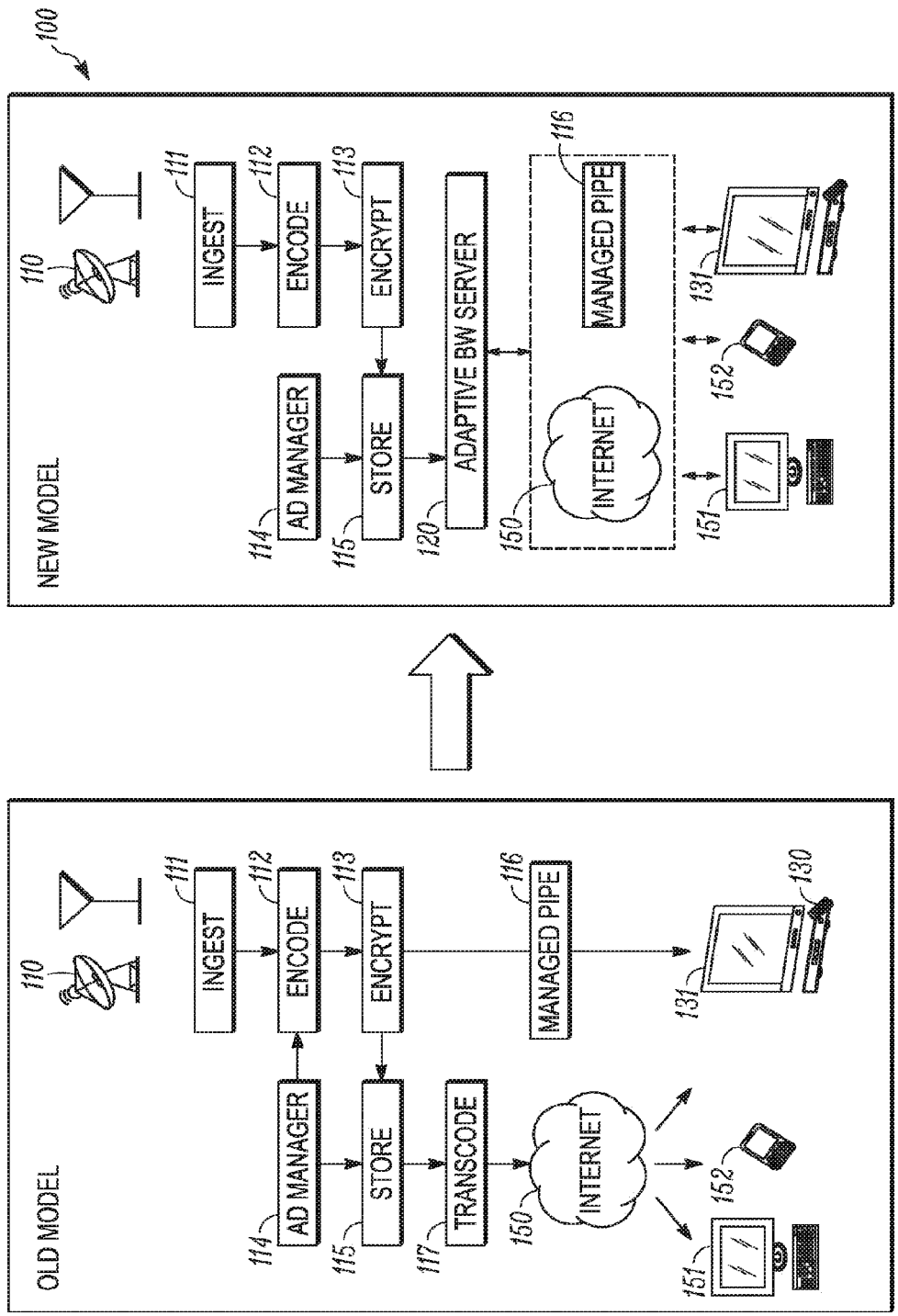
FIG. 2A illustrates the changes in the way in which service providers may distribute digital content to subscriber.
FIG. 2B illustrates novel changes in the way in which service providers may distribute digital content to subscriber.

FIG. 2A and FIG. 2B show changes in the way in which service providers may distribute digital content to subscriber. FIG. 2A, the current model (Old Model) 101, shows two distinct distribution models: a managed pipe 116, or multicast delivery, to set top boxes in the home 105, and unmanaged or web-based delivery 150 to, for example, PCs, tablets 151, and smartphones 152 using unicast download-and-play, streaming or other internet-friendly protocols (collectively, 150).

Service providers and operators currently distribute digital video programming to fixed-location set top boxes using a managed pipe or multicast protocol. A managed pipe is an information channel (also referred to as the "pipe") over which the amount of data allocated to individual programs and subscribers is controlled by the operator of the channel, a cable TV provider, for example. Multicast-based servers can support a larger audience by serving a single content stream simultaneously to multiple users. Multicast is a true broadcast. There is no direct relationship between the clients and media server. The server generates a file containing information that the client needs to listen for the multicast. This is similar to tuning into a station on a radio. Each client that listens to the multicast adds no additional overhead on the server. In fact, the server sends out only one stream per multicast station. The same load is experienced on the server whether only one client or 1,000 clients are listening.

On the other hand, in an unmanaged or unicast-based delivery, for example, over the Internet, media servers open and provide a stream for each unique user. In contrast to the managed or multi-cast pipe, the internet is a best-effort network which the service provider (cable internet, dsl, etc.) does not throttle content based on content type or subscriber identity. The effort to keep the internet an unmanaged pipe is at the center of "net neutrality".

Returning now to FIG. 2A, content can be received from a satellite or other source 110, to an ingest, or intake, point 111. From there, parts of the content optionally are replaced with advertisement content from ad manager 114, and the content can then be encoded 112. The encoded content can be encrypted 113. At this point, the content can be either stored 115 or, the content can progress through the managed pipe 116 where it eventually reaches its destination, a set-top box (STB) 130 and television set 131. If the content advances to be stored 115, it is stored and can be transcoded 117, and then delivered over an unmanaged channel such as the Internet 150 and reaches the destination client device, for example a computer 151 or tablet/smart device 152.

In contrast, the alternative model (New Model) 102 in FIG. 2B unifies distribution to set top boxes, PCs, tablets, smartphones, and the like via an adaptive bandwidth server 120 which has the capability to regulate the distribution of content based on both bandwidth availability and the video quality of each video segment and optionally operator policy. The server 120 utilizes a novel method to augment the encoding process by selecting media segments based on both the requests from client devices and the overall performance targets for the entire network and service. This novel two-way methodology allows delivery using one infrastructure and existing consumer equipment to support traditional multicast and HTTP delivery.

In FIG. 2B, content is received from a satellite or other source 110, to an ingest or intake point 111. From there, the content can be encoded and encrypted 113. The content, along with advertisements from ad manager 114, can be stored 115 in a memory. At this point, the encoded content is processed by the Adaptive Streaming Server 120 in response to requests from client device. Client device determines its bandwidth and processing capability and requests a media segment having the size and characteristics that can be delivered to and processed by client device in a time period short enough to maintain uninterrupted presentation of media on client device. Adaptive Streaming Server receives client request and retrieves the corresponding media segment and sends it to client device. Client device receives media segment. Client device then updates its determination of its bandwidth and processing capabilities and requests a next media segment. The process repeats until termination by client device. Client device may request media fragments by specifying a URL contained in a playlist stored on the client device. Playlists contains one or more URLs that correspond to media fragments having attributes such as size, format, resolution, frame rate, and the like. Client device may obtain playlist and update playlist by requesting playlist from Adaptive Streaming Server.

Service providers and operators currently distribute digital video programming to fixed-location set top boxes using a multicast protocol, as described above. As noted above, for mobile media platforms such as tablets and smartphones, adaptive streaming is gaining traction as a method of distributing digital content. The need to support both legacy set-top boxes and mobile platforms that are becoming popular create new challenges for service providers and operators. One challenge and opportunity addressed and solved herein, is to be able to deliver content to either fixed or mobile platforms using the best distribution option for each situation.

Figure 3:
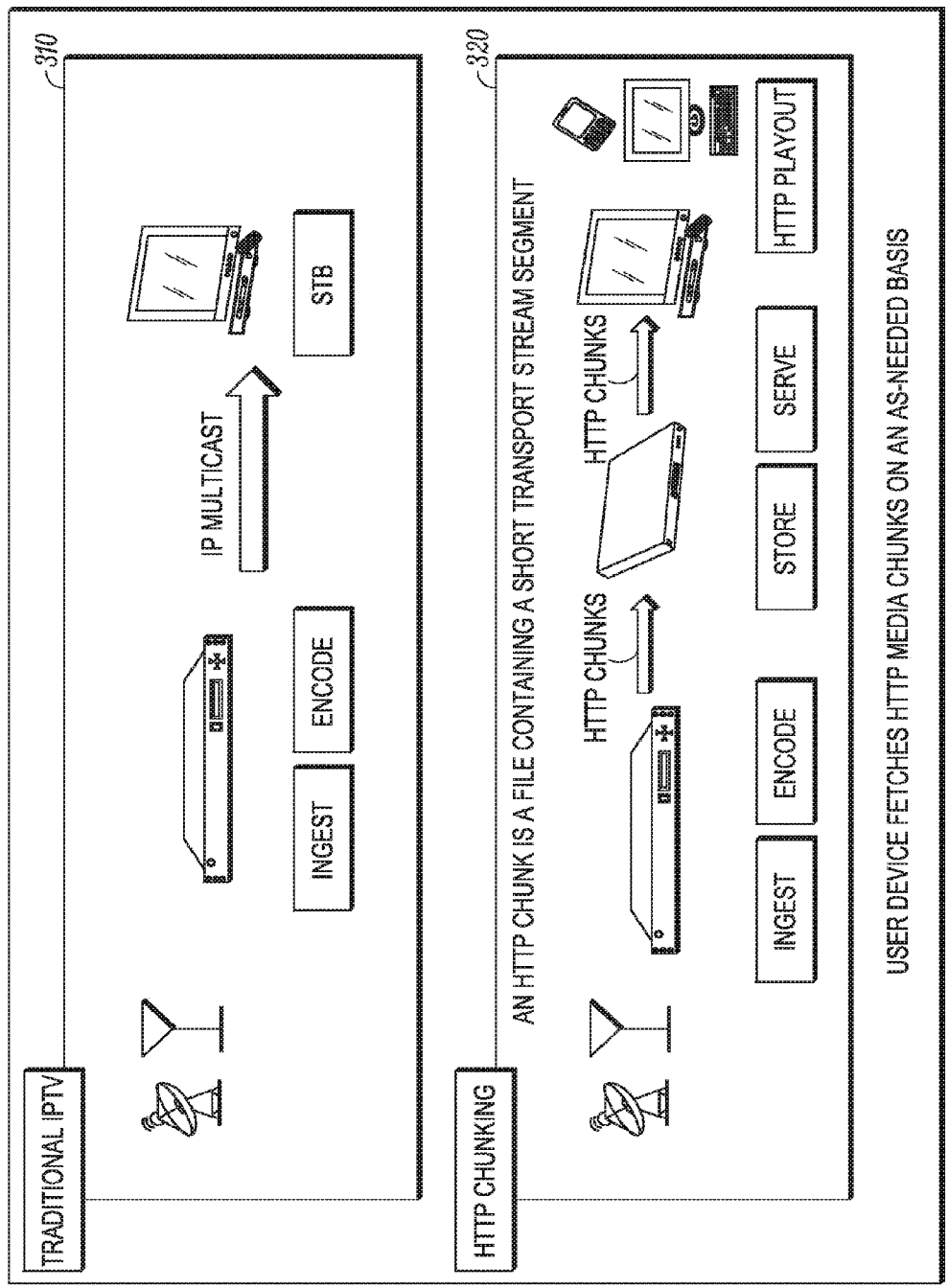
FIG. 3 shows differences between traditional IPTV and HTTP adaptive streaming.

FIG. 3 310 illustrates how HTTP adaptive streaming differs from traditional IP Television (IPTV). Traditional IPTV is a method of preparing and distributing television signals over an IP based data network. Typically, content streams are acquired, demodulated and decrypted if necessary, then re-encoded digitally for IP transport possibly with additional compression and new encryption. IPTV signals, or streams, are distributed on an IP based network (e.g. multicast) and viewed on an IPTV capable viewing device, usually a Set Top Box. The bit rate of the stream is controlled entirely by the operator, independent of the capabilities of clients. Usually, the operator provides subscribers with client devices that match the capabilities and bit rates of the operator's managed network thus providing a satisfactory experience. If the same stream were to be distributed over an unmanaged network, bandwidth would typically alternate between being insufficient and underutilized over time due to fluctuations in bandwidth demand and availability, resulting in both inefficient use of expensive bandwidth and interruptions in playback of media that would lead to an unsatisfactory consumer experience.

In contrast, in HTTP adaptive streaming, FIG. 3, 320, streaming media content can be divided into media segments, also called chunks or fragments, having a fixed duration. A continuous media program is delivered as a series of sequential media segments or chunks. Each fragment has several attributes, such as: start time, end time, byte size, codec type, and so forth. These fragments are typically pre-encoded and stored, but they could also be created on-the-fly by an encoder or transcoder or other media adapter. The media segments or fragments are distributed to the client device or devices over an HTTP network. Adaptive streaming enables client devices to adapt to changes in bandwidth and processing capabilities, thus enabling uninterrupted playback of media.

Figure 4:
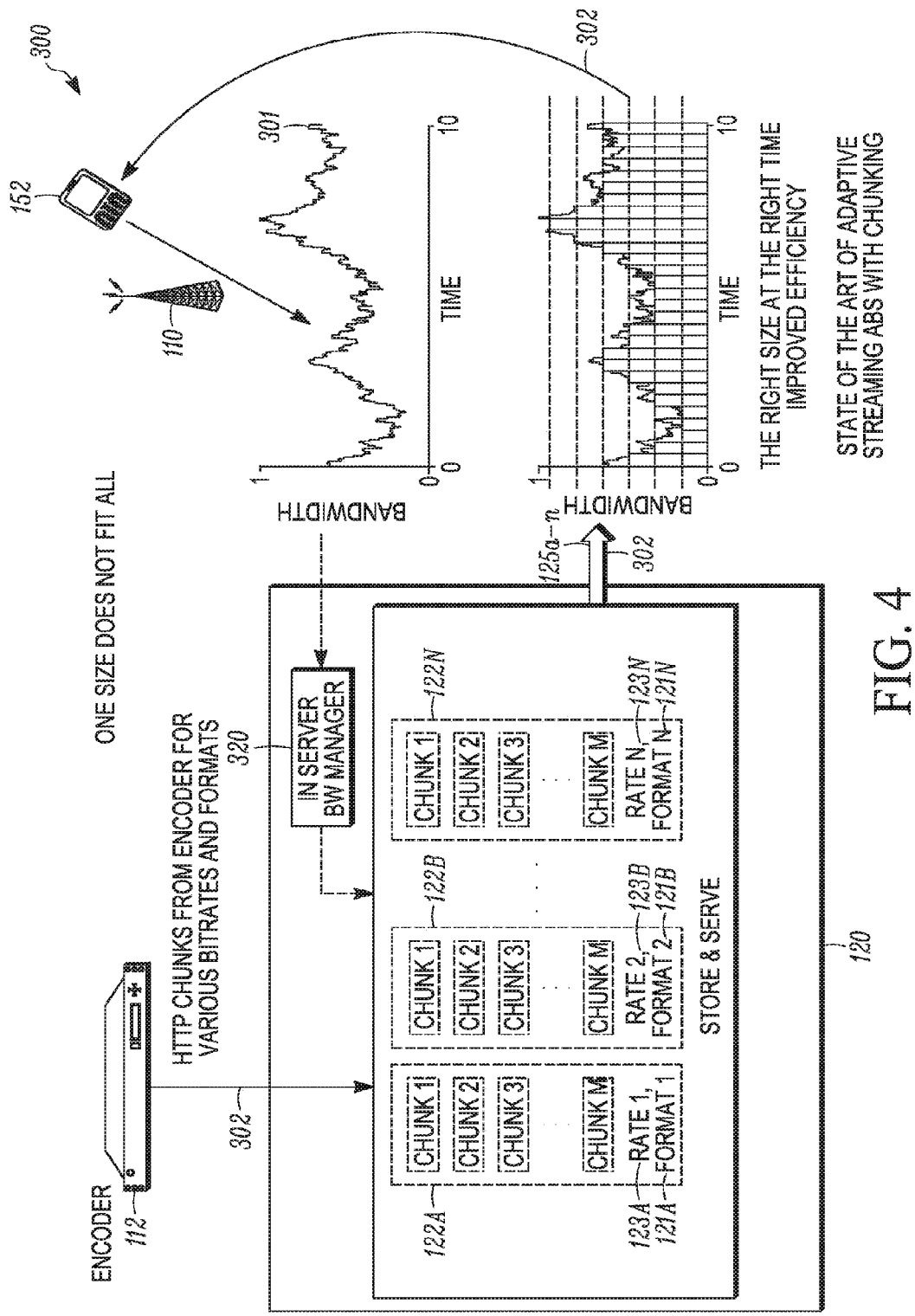
FIG. 4 is an illustration of the state-of-the art of adaptive streaming.

Moving now to FIG. 4, the state-of-the art of adaptive streaming, adaptive streaming with media segment, or chunking. As shown in FIG. 4, a client device, e.g. 152, monitors one or more of its performance metrics, such as: available bandwidth, processing capabilities, memory resources, display capabilities, codec & protocol compatibilities, and others into its performance profile 301

The client device 152 requests media segments that are compatible with its performance profile 301. An encoder 112 formats and sends HTTP media segments, or chunks from the encoder 112 for various bit-rates and formats. An adaptive server 120 sends the media segments 302 to the client device 152 as requested.

As the encoder 112 is a multi-rate and multi-format encoder, the encoder 112 receives an input signal, which may be baseband video or pre-encoded media file or stream and encodes the input stream as output stream 302a. In an embodiment, the output encoded signals 125a-n are configured by the encoder as, for example, MPEG transport stream (MPEG TS) signals. The output stream 302a is stored in adaptive server 120 as chunks 122 a-n at a rate 1-n and a format 1-n. As shown, each rate 123a-n has a different format 121a-n although it is understood that different combinations can be used into media segments or chunks 122a-n. The result/output of the encoder 112 is output encoded signals 125a-n corresponding to the rate and format combinations of the encoder.

These encoded signals 125a-n are supplied to the adaptive bandwidth server 120 and stored, or optionally supplied to the adaptive bandwidth server in real time. The variable media segment signals 125a-n are supplied to the ABR server 120 that can also serve as the media storage and manager entity. Each of the variable duration segments 125a-n is accessible to the ABR server 120 so that the ABR server can stream the requested media content to the device 152.

In an embodiment, the bandwidth manager or adapter 320 can be coupled to the encoder 112. It is also possible to configure the encoder 112 to incorporate the bandwidth manager or adapter 320. This is in contrast with the current state of the art in which the bandwidth manager is associated with each client, therefore bringing about the overextending or competitive grab for bandwidth, a problem which is solved by the embodiments disclosed herein. When coupled to the encoder the bandwidth manager or adapter 320 provides a reasonable or accurate bandwidth requirement for the media segments within the encoded signals 316a-n. In another embodiment, the bandwidth manager or adapter 320 can be coupled to the server 120, or the server 120 is configured with the bandwidth manager or adapter 320. In this embodiment, the bandwidth manager or adapter 320 is provided within the server 120 and determines the analysis required for processing of the variable duration segments 125a-n for use by the ABR server 120.

Efficient Use of Bandwidth in Distribution of Video Content Via ABR Streaming

Figure 5:
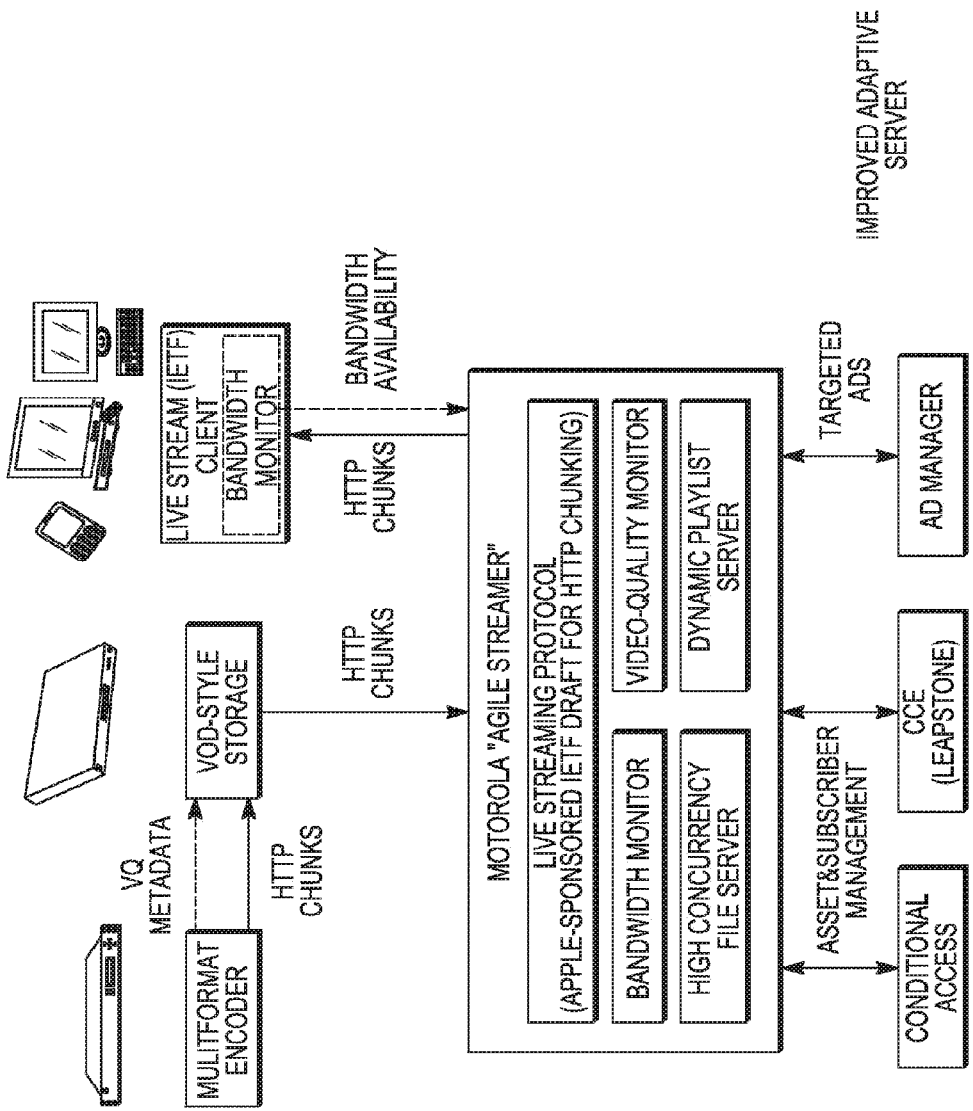
FIG. 5 is an illustration of an improved adaptive server.

FIG. 5 is an illustration of an improved adaptive server 120 according to the novel embodiments provided herein. Video encoders and/or repositories of pre-encoded content are accessed by an adaptive bandwidth server, referred to herein as an Agile Streaming server that has various capabilities made possible by system and methods disclosed herein. As used herein the term Agile Streamer Server or Agile Streamer Adapter or Agile Streamer means that the capabilities of the Agile Streamer are embedded either in a server configuration, an encoder configuration or as a standalone component. Use of one configuration implies use the other configurations for any particular embodiment. One of the key capabilities of the server is to regulate the distribution of content based on both bandwidth availability and the video quality of each media segment. The server selects media segments based on both the requests from client devices and the overall performance targets for the entire network and service. The server may also communicate and respond to messages from digital rights and security systems, customer authorizations systems, content management systems, advertising systems, and other systems. In an embodiment, an Agile Streaming Server may derive its video quality management metrics from such external systems.

Figure 6:
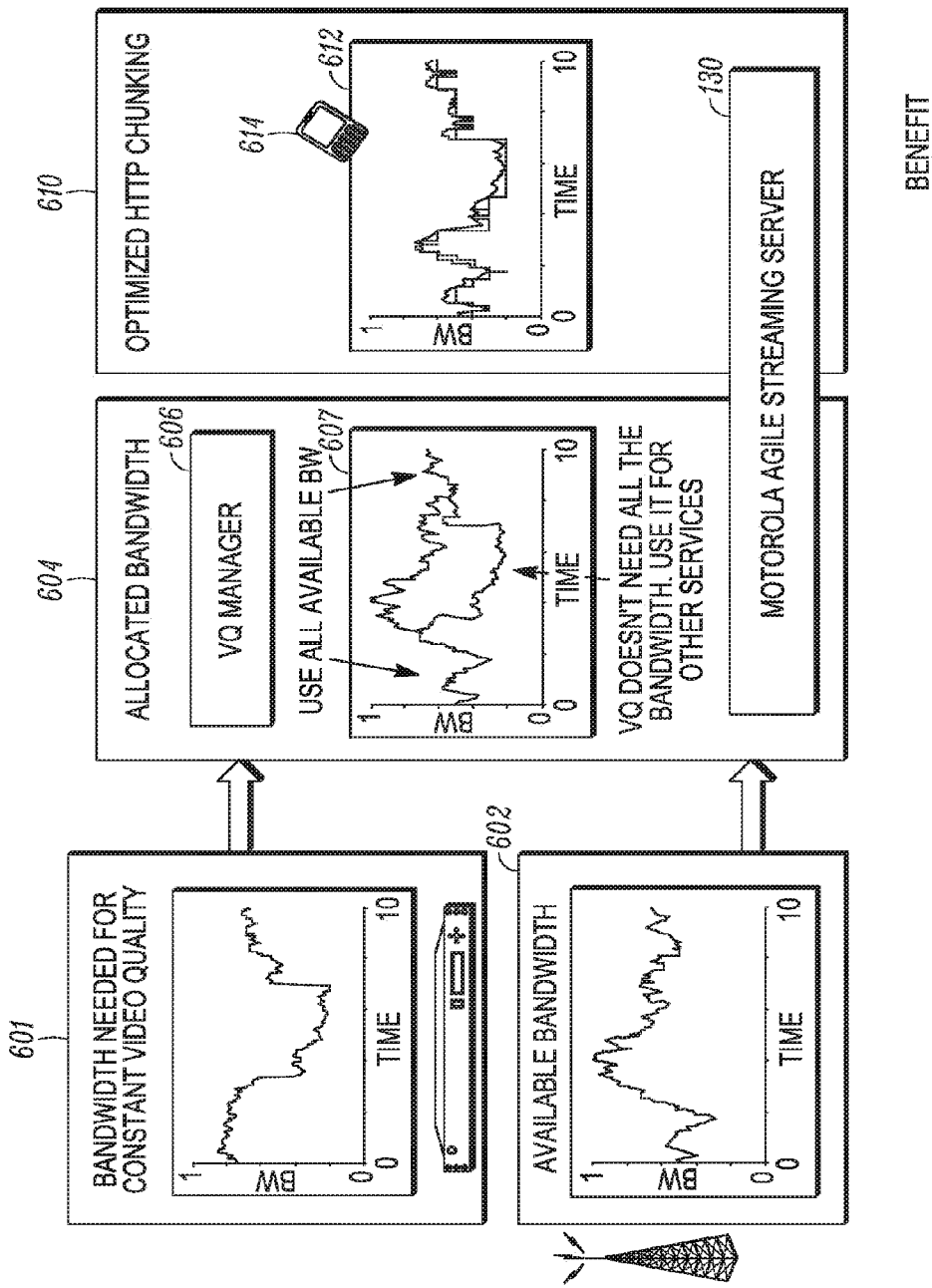
FIG. 6 is a graphical representation of improvements in dynamic bandwidth and video quality management.

FIG. 6 illustrates a benefit of the Agile Streaming server implementation. An Agile Streaming Server is able to make bandwidth available for other clients or services (such as data and voice) by managing video quality and, perhaps, other consumer metrics such as, for example, subscription type. If media segments requested by a client correspond to a video quality that is greater than the threshold set by the service provider, the Agile Streaming Server will select and deliver an alternate version of the media segment having a video quality that complies with the service-provider's policy. The Agile Streaming Server accounts for the bandwidth and can make it available for other clients and services, thereby improving overall efficiency. Returning now to FIG. 6, the bandwidth needed to achieve or maintain constant video quality is shown at 601. The bandwidth available to the device is shown at 602. The Agile Streaming server 130 receives information related to at least, for example, both data points 601 and 602, required bandwidth and available bandwidth, and determines how to best utilize the available bandwidth for optimization of all services. The Agile Streaming server 130 utilizes an allocated bandwidth module 604 which comprises a video quality (VQ) manager 606. The VQ manager 606 determines the bandwidth needs and availability over time 617, and, in this example, determines that VQ doesn't need all of the available bandwidth. Therefore, some "surplus bandwidth" can be used for other services. Other modules include an optimized HTTP adaptive streamer 610, or HTTP chunking. Here the device 614 utilizes the scheme 612 where all of the bandwidth is utilized at certain points while at other points in time, bandwidth is freed up for other services. The chart at 612 shows how the media segments, or chunks, could be sent in order to achieve the goal shown in 607

Figures 7A, 7B:
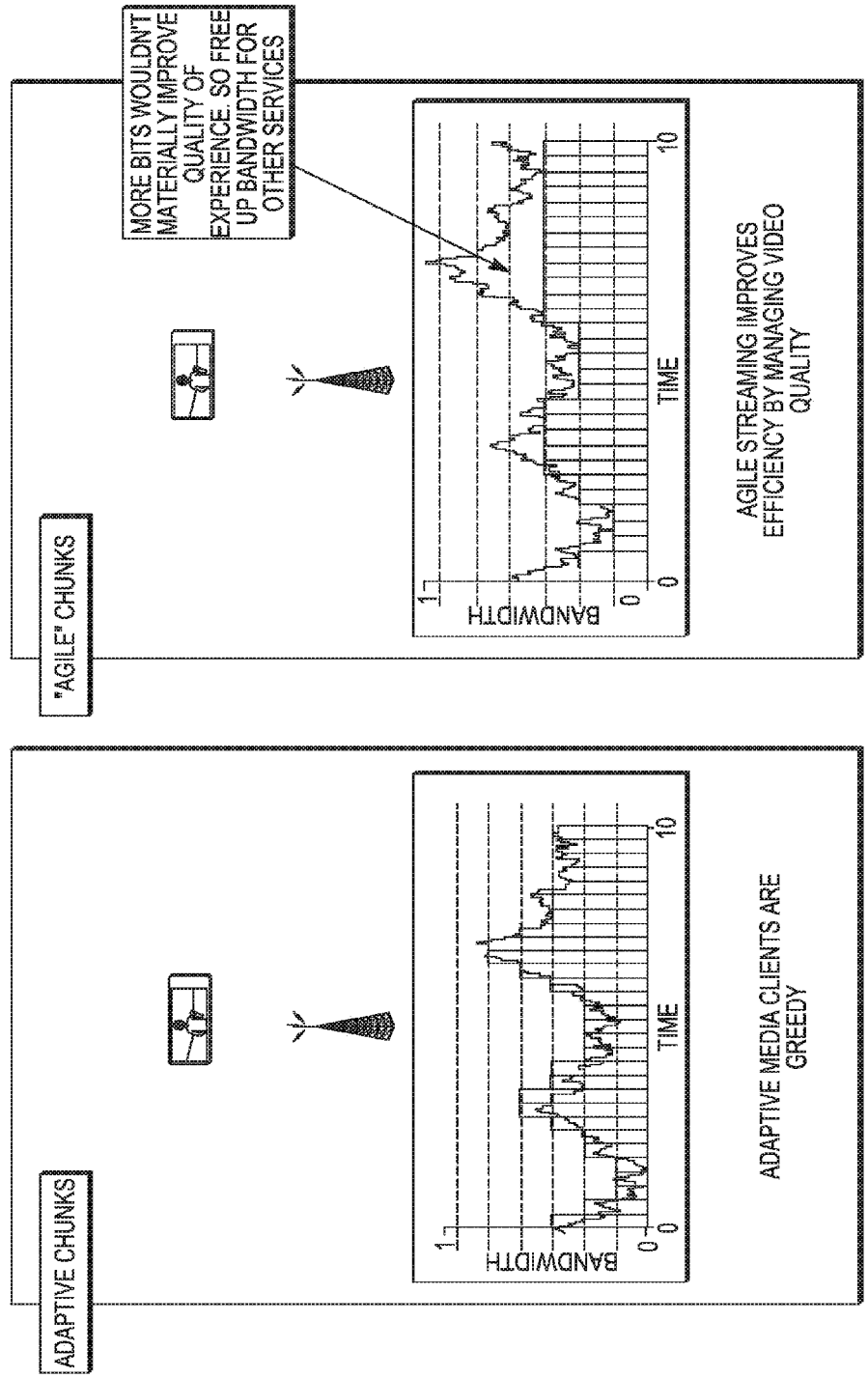
FIG. 7A is an illustration of adaptive streaming.
FIG. 7B is an improved adaptive streaming using constrained-fidelity approach of Agile Streaming.

FIGS. 7A and 7B is an example of adaptive streaming vs agile streaming. FIGS. 7A and 7B illustrate an enhanced method for selecting media fragments that manage the video quality and bit rate of the multicast stream. A fragment (e.g. media section or chunks)-selection process inspects media fragments and selects fragments that are compatible with the maximum bit rate allocation. For each fragment selected, the fragment-selection process compares the video-quality values to the maximum video-quality values. If the video-quality value of the selected fragment exceed the maximum video-quality value, the fragment-selection process will then continue to select different fragment until it finds a fragment that has a video-quality factor less than or equal to the maximum video-quality value. In this way, the agile streaming server modifies the requests from client devices thereby improving sharing of bandwidth between clients and between client devices and other services that may co-exist on the network.

Figure 8:
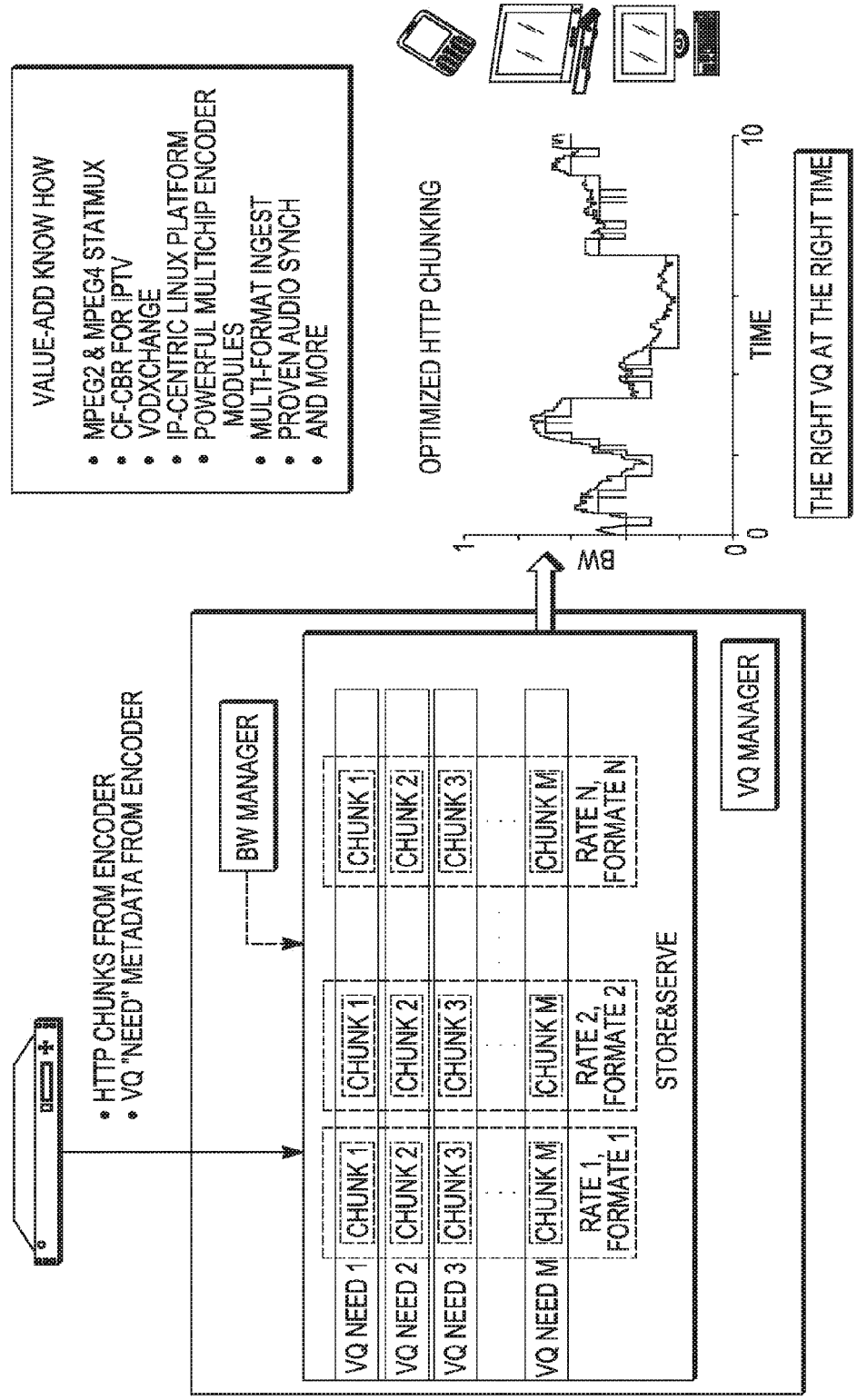
FIG. 8 is an illustration of generating Video-Quality metrics for use in the Agile Streaming Server.

FIG. 8 illustrates generating Video-Quality metrics for use in the Agile Streaming Server. The video quality metrics used by the Agile Streaming Server to enforce service-operator policies may be generated in a number of ways. One method is to generate in an encoder during the encoding process in a manner similar to that currently used in statistical multiplexing systems. Another method generates during a transcoding and segmentation process (not shown). Another method would generate video quality metrics by a dedicated video quality assessment process or device (not shown).

Delivering Over-the-Top (OTT) Video Content Over Legacy Multicast Networks and STBs Service providers and operators currently distribute digital video programming to fixed-location set top boxes using a multicast protocol. For mobile media platforms such as tablets and smart phones, adaptive streaming is gaining traction as a method of distributing digital content. However, these existing methods and systems are limited to delivery only to the specifically-programmed client. The need to support both legacy set-top boxes and mobile platforms that are becoming popular create new challenges for service providers and operators. Following are novel embodiments for systems and methods for delivering over-the-top (OTT) video content over legacy multicast networks and set top boxes. In a standalone configuration, the Agile Streamer, as disclosed herein, can be used alongside any number of devices to apply its functionality as disclosed herein and interface with client device requests.

Figure 9:
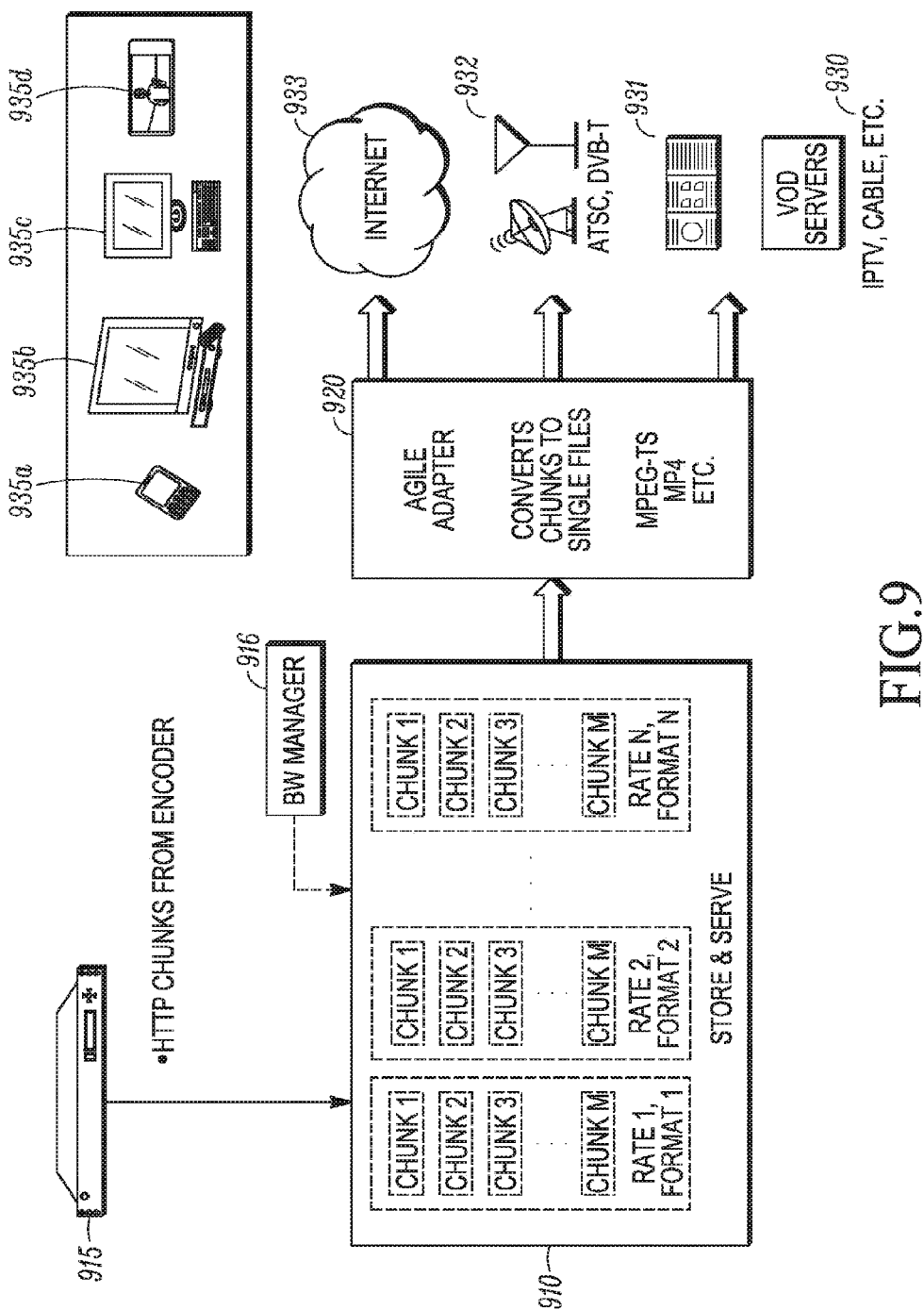
FIG. 9 shows the Adaptive-Streaming-to-Multicast-Streaming adapter.

Moving now to FIG. 9, an adaptive-streaming-to-Multicast-streaming adapter is shown. Media segments (also referred to as chunks and fragments) are stored in a server or repository 910. In some cases, media segments may be created on the fly. An adapter, e.g. Agile Streaming Adapter 920 acts as a client device, but instead of displaying the content for immediate viewing, it combines the media fragments into a seamless multicast stream for delivery to legacy media distribution protocols, including over-the-air broadcast, cable, IPTV, and others.

In this embodiment, video content is encoded by the encoder 915. The encoder sends HTTP media fragments or chunks to the server 910. The server 910 can also include or act as a bandwidth manager 916. The encoded chunks are stored and ready to be delivered via the Agile Streaming Adapter 920 to the end device. From the end device or client side, devices such as IPTV and Cable, etc 930, VOD servers 931, ATSC, DVB-T 932, and devices 935*a-d*, smart device 935*a*, computer 935*b*, phone, 935*c*, etc. are able to receive the same video content stream from the server 910 because the Agile Streaming Adapter 920 converts the media segments to single files in the format required by the end device.

The Agile Adapter 920 is a novel ABR-to-multicast adapter. In one embodiment, it is a module executing code from a memory in an ABR encoder (for creation and conversion of ABR chunks). In one embodiment the Adapter 920 is a module executing, via a processor, code stored in a streaming server that performs stitching and multiplexing (for collection and conversion of pre-existing ABR chunks). In yet another embodiment, it is a stand-alone server or software/hardware board in a server.

The Agile Adapter 920 receives the encoded stream and converts the chunks to single files. In files can be any number of formats as dictated by the client device. For example, some formats or protocols include MPEG-TS, MPEG4, etc. In both cases, targeted use cases would be those such as live over-the-air, IPTV, cable, satellite, video-on-demand, blu_ray discs, etc. (any place an encode-once-use-by-many transport streams could be used.)

In such embodiments, the notion of moving between ABR and multi-cast and vise versa begins to undo the distinctions between a stand-alone dedicated encoder and a HTTP server. In one embodiment, the Adapter 920 as described in the afore-mentioned figures, provides a method of turning an HTTP server into what was formerly thought of as a stand-alone encoder.

Figure 10:
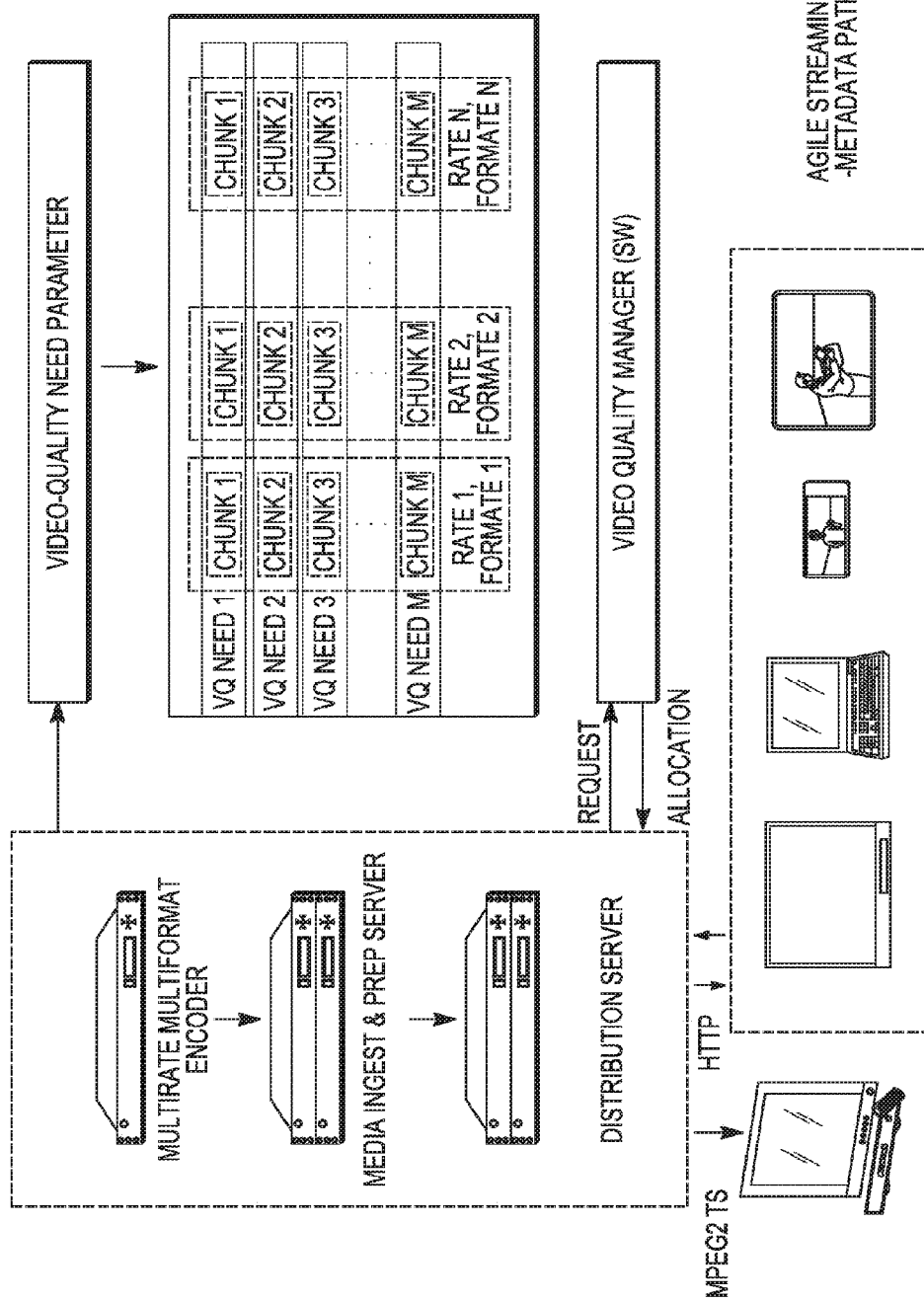
FIG. 10 shows an enhanced adaptive server that manages the video quality and bit rate of adaptive bit rate chunks and multicast streams, using a Metadata Approach.

FIG. 10 shows an enhanced Agile Streaming Server that manages the video quality and bit rate of both or either HTTP adaptive streaming distribution and multicast distribution. A fragment-selection process inspects media fragments and selects fragments that are compatible with the maximum bit rate allocation. For each fragment selected, the fragment-selection process compares the video-quality values to the maximum video-quality values. If the video-quality value of the selected fragment exceed the maximum video-quality value, the fragment-selection process will then continue to select different fragment until it finds a fragment that has a video-quality factor less than or equal to the maximum video-quality value. Media fragments will then be sent to the client device by means of an adaptive streaming protocol or as unfragmented media via an Agile Adapter, depending on the capabilities of the client device and policy of the operator.

Figure 11:
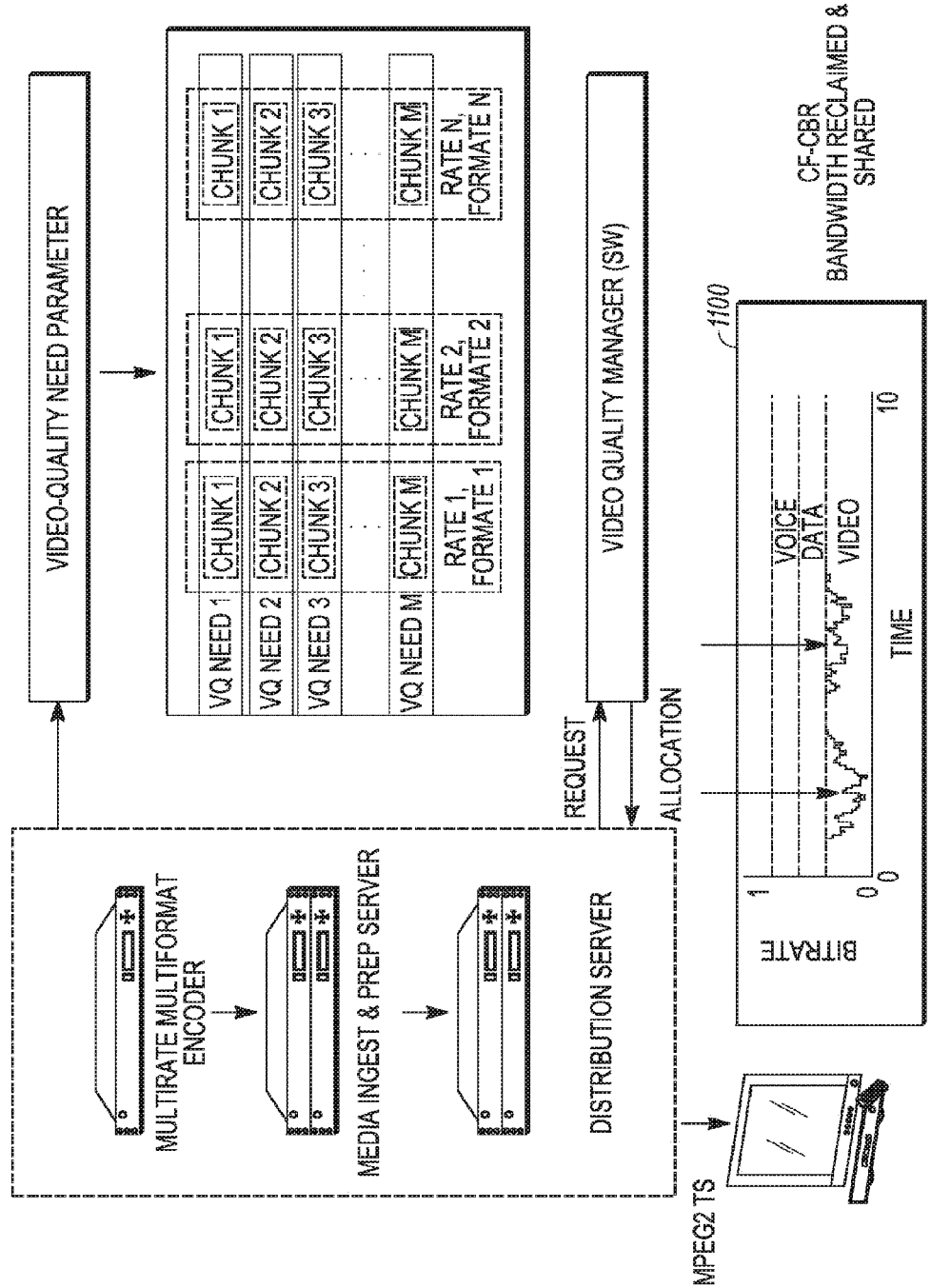
FIG. 11 illustrates implementing distribution of digital media using a Constrained Fidelity Constant Bit Rate (CF-CBR) multi-cast protocol.

FIG. 11 illustrates an example of an implementation of the distribution of digital media using a Constrained-Fidelity Constant Bit Rate (CF-CBR) multicast protocol from an Agile Streamer Server. CF-CBR is a means by which a service provider can share video bandwidth with other services such as voice and data to improve overall efficiency while maintaining a minimum operational threshold for video quality.

Prior art video encoders are designed to operate in one of two distinct ways: variable bit rate mode (VBR) or constant bit rate mode (CBR) mode. In basic terms, a CBR stream is created by adapting or varying the quantization parameters to produce a constant bit rate. With VBR mode, the quantization parameters are nearly static to produce a variable rate stream. DVDs, for instance, are encoded using VBR mode and produce very consistent quality. The fundamental principle is that simple scenes require less bandwidth than scenes with a lot of motion and detail.

In an ideal world, without bandwidth constraints, VBR would universally be used. However, most applications have bandwidth constraints and, therefore, they do not have the luxury of being able to support VBR. These applications require rate control mechanisms that constrain the bit rate within a predefined setting. Various methods such as statistical multiplexing have been developed to allow multiple VBR services to be delivered over a fixed channel by ensuring that the combined bit rate from the encoders does not exceed the bandwidth available from a channel of a fixed size, or, stated differently, does not over subscribe the fixed channel size. However, in a switched broadcast application such as IPTV, services are delivered to a home on an individual basis and statistical multiplexing (statmux) is not an option.

There exists a CBR/VBR hybrid implementation for encoding video data streams that can be thought of as Constrained Fidelity CBR. The system identifies low complexity content which requires less bandwidth to encode with acceptable quality, and reduces below the maximum bandwidth accordingly. This frees additional bandwidth to the channel for use by other services. This can also be described as CBR that will not encode video with more bits than it needs (or constrained fidelity CBR). Alternatively, in at least some implementations, the present invention may also be thought of as VBR with a cap (or capped VBR.)

In addition, for at least some embodiments, the ability to enable null packets may be included for, for example, applications that want to fix the bit rate at one point in the network so that bandwidth reclamation can be performed in downstream devices.

Returning now to FIG. 11, the basic flow is the same as FIG. 10 and will not be repeated here. The graphical representation 1100 illustrates one example of CF-CBR bandwidth reclaimed and shared. As described above, the system determined the need and the availability of bandwidth over time and determined bandwidth usage scheme such that bandwidth was reclaims and available to other services.

As shown in the above-described embodiments, systems and methods for techniques for delivering over-the-top (OTT) video content over legacy multi-cast networks and set top boxes are disclosed. There are numerous benefits realized as a result of implementation of the systems and methods disclosed. As discussed above, the disclosed methods and systems provide delivery of over-the-top (OTT) video content over legacy multicast networks and set top boxes via the Agile Adapter which converts a HTTP media segment chunk stream into any number of formats required by the end user client device. Also provided is the ability to provide adaptive streaming content over fixed channels that support multiple service types, such as video, data, and voice.

In one embodiment, converting adaptive streaming content to constrained-fidelity bit streams improves bandwidth usage and reduces network congestion because unneeded CF-CBR bandwidth is reclaimed and shared. This can result in an increase of the service operating range for bandwidth-constrained networks, thereby increasing the number of potential customers that could be served by a service provider. This method can also seamlessly allow people to share a network which can overcome inefficiency of unicast adaptive streaming, as compared to multicast streaming, when multiple users try to share a network.

Also provided are techniques by which to increase the service operating range for bandwidth-constrained networks, thereby increase the number of potential customers that could be served by a service provider.

Managing Quality of Experience for Video Distributed Over Unmanaged Networks

Delivery of video programming over the Internet does not typically provide the same quality of experience as delivery over traditional distribution channels, such as: cable, satellite, IPTV, etc. The internet is unmanaged, in the sense that certain resources, such as bandwidth, are not pre-assigned for certain services and users. As a result, use of HTTP adaptive streaming is less reliable and predictable than traditional distribution models. The lack of reliable, predictable quality could negatively impact content provider reputations and revenues.

Moreover, the rapid rise in use of over-the-top (OTT) and adaptive streaming creates new burdens for content-delivery networks (CDNs) that typically act as OTT delivery intermediaries between content providers and consumers. Adaptive streaming client devices are greedy in the sense that they request the maximum bit rate media fragments consistent with their available bandwidth and processing constraints, and without regard to other traffic. Accordingly, there exists a need to improve managing the quality of experience for video distributed over unmanaged, best-effort networks. The embodiments described herein provide a tool by which CDNs and content providers can manage the quality of experience of multiple users, multiple programs, and multiple service groups.

FIG. 12 illustrates a comparison of traditional media distribution and emerging Over-the-Top (OTT) distribution over the internet. As shown, the Traditional Model of distribution (cable, over the air, satellite, IPTV, etc.) uses a communications channel that is actively provisioned and managed by service providers. OTT makes use of best-effort IP protocols that typically provide inferior quality-of-service and quality-of-experience compared to service-provider-managed channels. The Agile Streaming Server provides a means of improving the quality-of-experience for the OTT model because it allows bandwidth distribution to be optimized in an environment that isn't accustomed to management.

Referring back to FIGS. 7A and 7B is one example of an adaptive streaming service capable of joint management of bandwidth and video quality according the embodiments described herein. FIGS. 7A and 7B illustrate an enhanced adapter or server that manages the video quality and bit rate of the multicast stream. A fragment-selection process inspects media fragments and selects fragments that are compatible with the maximum bit rate allocation. For each fragment selected, the fragment-selection process compares the video-quality values to the maximum video-quality values. If the video-quality value of the selected fragment exceed the maximum video-quality value, the fragment-selection process will then continue to select different fragment until it finds a fragment that has a video-quality factor less than or equal to the maximum video-quality value.

Figure 13:
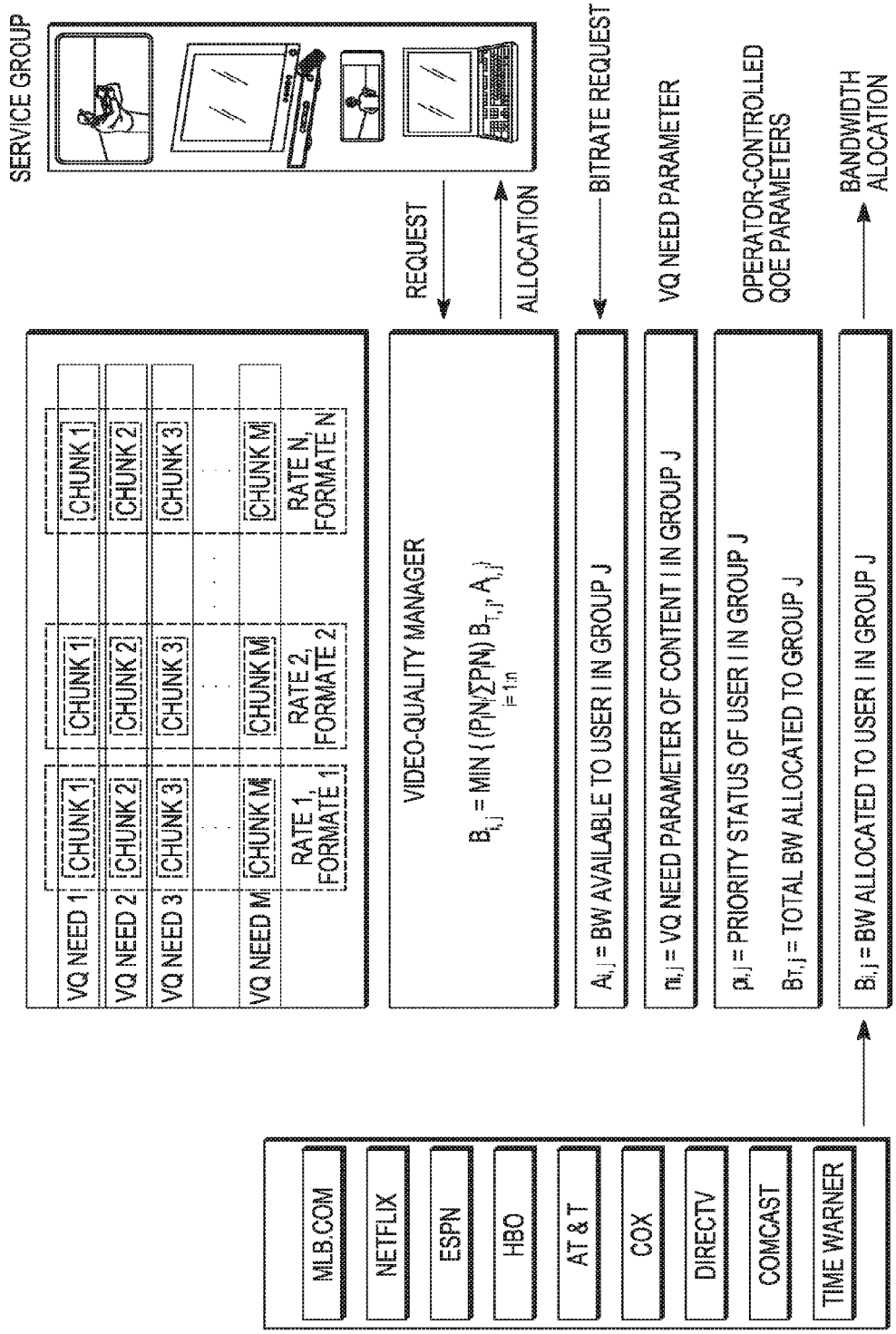
FIG. 13 illustrates simultaneous management of the quality of experience of multiple users.

FIG. 13 illustrates simultaneous management of the quality of experience of multiple users. The adaptive Streaming Server selects media segments to deliver to individual clients based on several factors. For example, factors can include the content requested by the client; the total bandwidth available to all clients in a group; the video qualities of segments that correspond to the content requested by the clients; and the service provider's policies relating to subscriber priority, program priority, and operation video quality targets. A candidate method of selecting segments is illustrated by the equation shown below, which is a weighted apportionment of total available bandwidth that specifies the size, in bits, of media segment to be selected and delivered to each client in the group within a particular interval of time.

$$B_{i,j} = \min\left\{\frac{p_i n_i}{\sum_{i=1:N} p_i n_i} B_{T,j}, A_{i,j}\right\}$$

Figure 14:
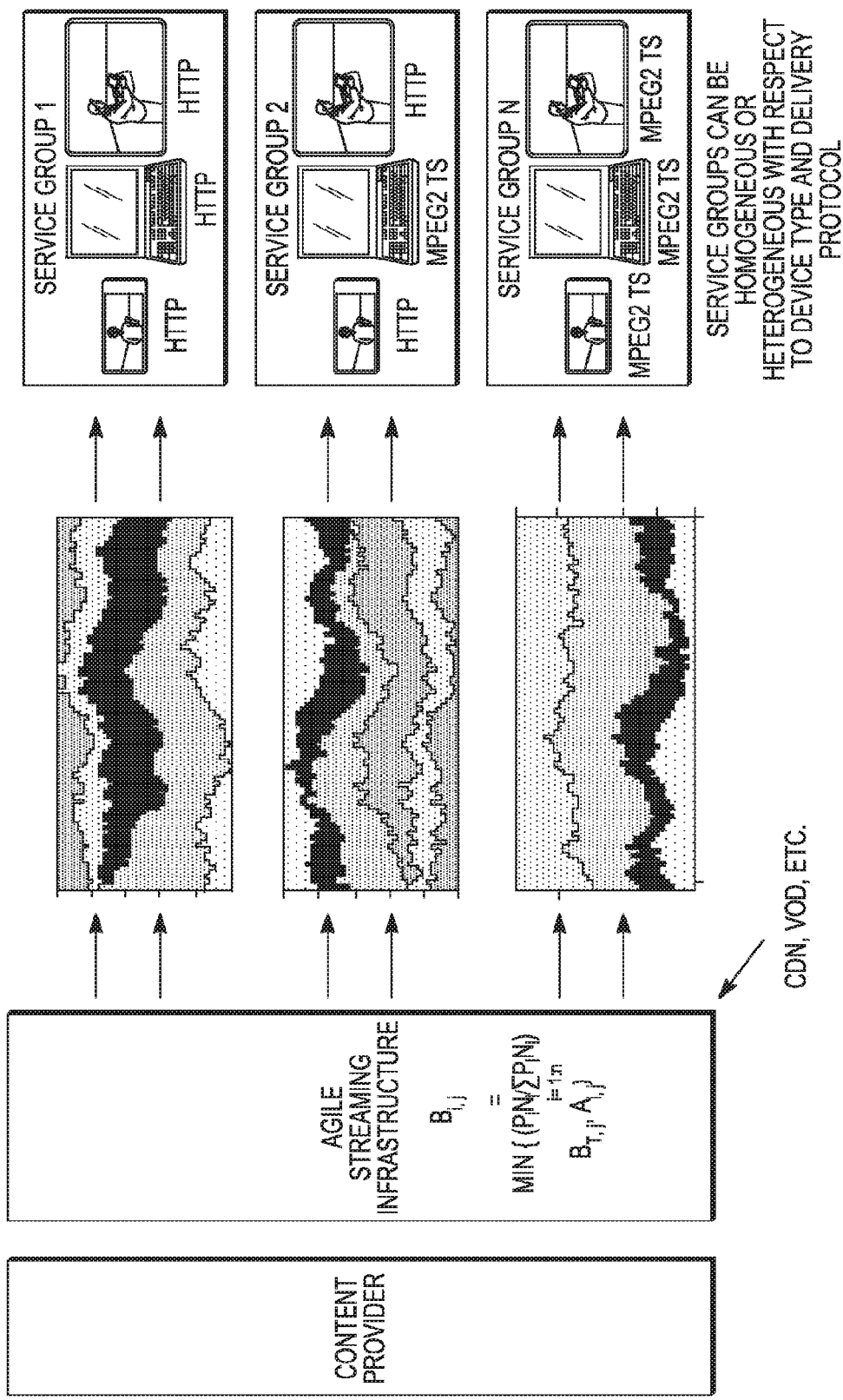
FIG. 14 illustrates one example for supporting multiple groups at one time using Agile Streaming Infrastructure.

FIG. 14 illustrates an inventive method to support multiple groups at the same time. The disclosed Agile Streaming Infrastructure supports any mixture of web-based protocols, for example, HTTP, streaming, download-and-play, etc. It also supports traditional service provider protocols, for example multicast, MPEG transport stream, video-on-demand, and over-the-air-broadcast, along with any mixture of web-based and traditional protocols. The various protocols may be mixed within and between groups. Service groups may be defined by the service or content provider according to any criteria, such as: geography, subscription type, device type, connection type, randomly, etc.

Figure 15:
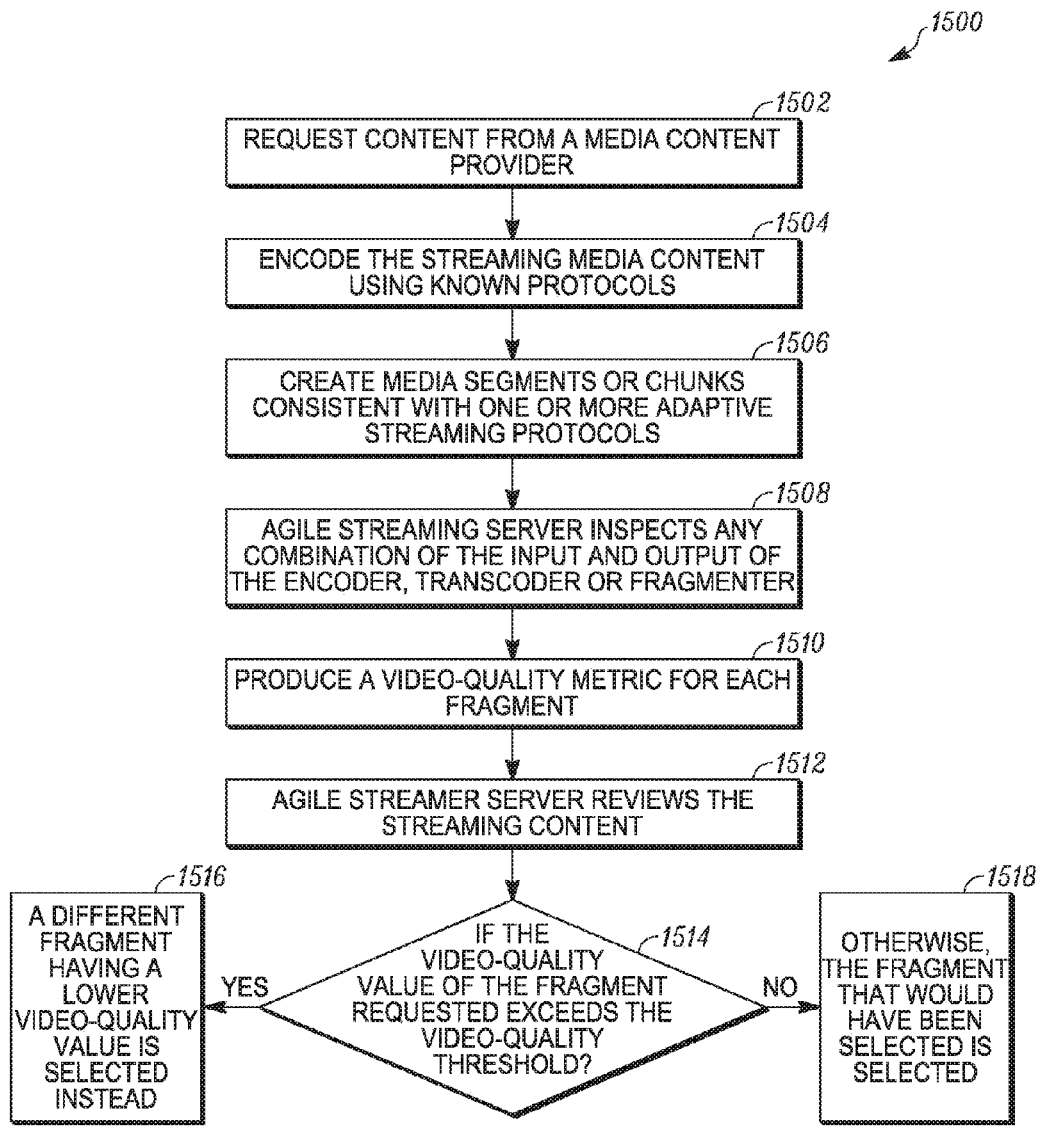
FIG. 15 illustrates one example of a method for achieving efficient bandwidth in distribution of video content via adaptive streaming.

FIG. 15 is a flow chart that shows an operation of an ABR system 1500 that streams media content using Agile Streaming Server. The process begins at block 1502 with a device requesting content from a media content provider. The media content provider supplies the media content to the device by streaming the media content. In order to stream the media content, at block 1504 an encoder encodes the streaming media content using known protocols. The encoder can use multi-rate and multi-format encoding. At block 1506 a fragmenter creates media segments or chunks consistent with one or more adaptive streaming protocols. At block, 1508 the Agile Streaming Server inspects any combination of the input and output of the encoder, transcoder or fragmenter and at block 1510 produces a video-quality metric for each fragment.

At block 1512, the Agile Streamer Server reviews the streaming content and at 1514 if the video-quality value of the fragment requested exceeds the video-quality threshold, at block 1516 a different fragment having a lower vide-quality value is selected instead, and otherwise, at block 1518 the fragment that would have been selected is selected at block 1510.

Figure 16:
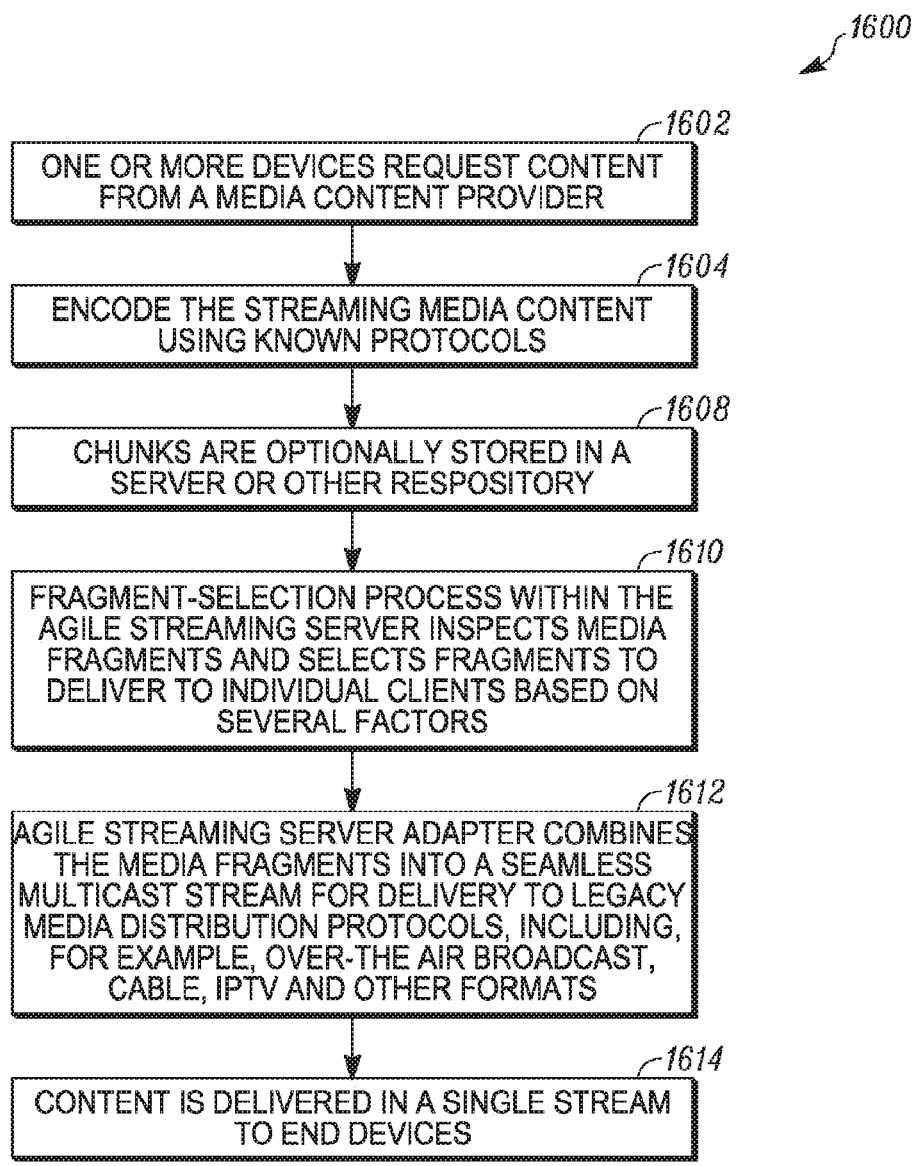
FIG. 16 illustrates another example of a method for delivering over the top video content via legacy multicast networks and set top boxes.

FIG. 16 is a flow chart that shows the operation of an ABR system 1600 that streams media content using an Agile Streaming Server adapter for delivery of over-the-top video content over legacy multicast networks and set-top boxes. The process begins with a device requesting 1602 content from a media content provider, e.g. the client selects a channel. The media content provider supplies the media content to the device by streaming the media content. In order to stream the media content, an encoder encodes 1604 the streaming media content using known protocols. The encoder can use multirate and multiformat encoding. Then, at block 1608 the chunks are optionally stored in a server or other repository. At block 1610 a fragment-selection process within the Agile Streaming Adapter, or server, inspects media fragments and selects fragments to deliver to individual clients based on several factor, including, for example: the content requested by the client; the total bandwidth available to all clients in a group; the video qualities of segments that correspond to the content requested by the clients; and the service provider's policies relating to the subscriber priority, program priority, and operation video quality targets.

In one embodiment, the segments are selected via a weighted apportionment of total available bandwidth that specifies the size, in bits, of media segment to be selected and delivered to each client in the group within a particular interval of time. At block 1612 the Agile Streaming Server adapter combines the media fragments into a seamless multicast stream for delivery to legacy media distribution protocols, including, for example, over-the air broadcast, cable, IPTV and other formats. At block 1614 content is delivered in a single stream to end devices. In one embodiment, constrained-fidelity constant bit-rate (CF-CBR) multicast protocol can be combined with method 1600 resulting in the advantage that a service provider can share video bandwidth with other services as voice and data to improve overall efficiency while maintaining a minimum operational threshold for video quality.

Figure 17:
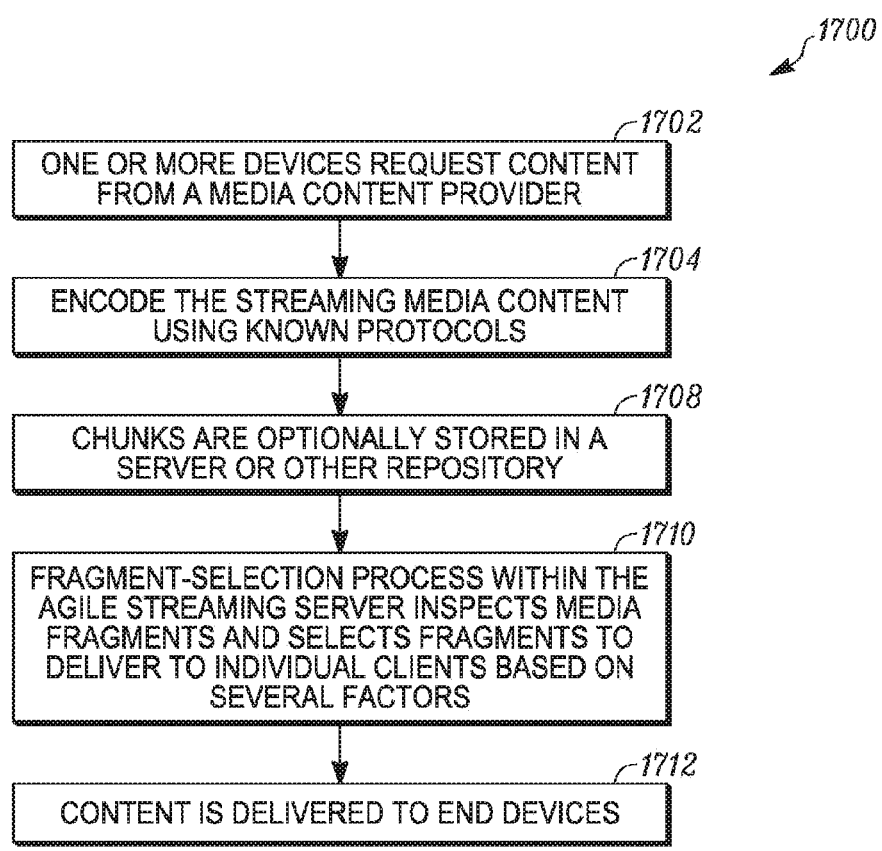
FIG. 17 illustrates yet another example of a method for managing the quality of experience for video distributed over unmanaged or best efforts networks.

FIG. 17 is a flow chart that shows one operation of an ABR system 1700 that streams media content using an Agile Streaming Server for managing the quality of experience for video distributed over unmanaged or best efforts networks. In other words, method 1700 illustrates the simultaneous management of the quality of experience of multiple users.

The process begins with one or more devices requesting 1702 content from a media content provider. The media content provider supplies the media content to the device by streaming the media content. In order to stream the media content, an encoder encodes 1704 the streaming media content using known protocols. The encoder can use multirate and multiformat encoding. Then, at block 1708 the chunks can be optionally stored in a server or other repository. At block 1710 a fragment-selection process within the Agile Streaming Server inspects media fragments and selects fragments to deliver to individual clients based on several factors, including, for example: the content requested by the client; the total bandwidth available to all clients in a group; the video qualities of segments that correspond to the content requested by the clients; and the service provider's policies relating to the subscriber priority, program priority, and operation video quality targets.

In one embodiment, the segments are selected via a weighted apportionment of total available bandwidth that specifies the size, in bits, of media segment to be selected and delivered to each client in the group within a particular interval of time.

At block 1712 content is delivered to end devices. Any mixture of web-based protocols, for example HTTP, streaming, download-and-play, etc, is supported. In one embodiment, constrained-fidelity constant bit-rate (CF-CBR) multicast protocol can be combined with method 1700 resulting in the advantage that traditional service provider protocols such as multicast, MPEG transport stream, video-on-demand, over-the-air-mixed broadcast, etc, and any mixture of web-based and traditional protocols can be utilized. The various protocols can be mixed within and between groups. Service groups may be defined by the service or content provider according to any criteria, such as geography, subscription type, device type, connection type, or randomly, etc.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    encoding a video to produce a plurality of fragments in one or more adaptive bitrate formats;
    storing the plurality of fragments;
    receiving a request for content from a plurality of client devices;
    determining whether the plurality of client devices support adaptive bitrate streaming;
    responsive to determining that the plurality of client devices do not support adaptive bitrate streaming, creating a multicast stream from fragments from the plurality of fragments in a format supported by the plurality of client devices; and
    transmitting the multicast stream to the plurality of client devices according to a multicast protocol.

2. The method of claim 1, wherein the multicast protocol is an unfragmented real time delivery protocol and the multicast stream is created in the unfragmented real time delivery protocol.

3. The method of claim 1, wherein the multicast stream is a MPEG2 transport stream.

4. The method of claim 1, further comprising:
    creating a plurality of multicast streams from fragments from the plurality of fragments, each of the plurality of multicast streams in a format supported by a client device.

5. The method of claim 1, wherein the fragments used to create the multicast stream are selected based on available bandwidth of client devices in a group.

6. The method of claim 1, wherein the fragments used to create the multicast stream are selected based on a service provider policy applicable to one or more subscribers of client devices.

7. The method of claim 1, wherein the multicast protocol is Internet Protocol Television (IPTV).

8. The method of claim 1, wherein the multicast protocol is an over-the-air broadcast protocol.

9. The method of claim 1, wherein the plurality of client devices are set-top boxes.

10. A computer program product comprising a non-transitory computer-readable storage medium containing computer program instructions for:
    encoding a video to produce a plurality of fragments in one or more adaptive bitrate formats;
    storing the plurality of fragments;
    receiving a request for content from a plurality of client devices;
    determining whether the plurality of client devices support adaptive bitrate streaming;
    responsive to determining that the plurality of client devices do not support adaptive bitrate streaming, creating a multicast stream from fragments from the plurality of fragments in a format supported by the plurality of client devices; and
    transmitting the multicast stream to the plurality of client devices according to a multicast protocol.

11. The computer program product of claim 10, wherein the computer program instructions further for:
    creating a plurality of multicast streams from fragments from the plurality of fragments, each of the plurality of multicast streams in a format supported by a client device.

12. The computer program product of claim 10, wherein the fragments used to create the multicast stream are selected based on available bandwidth of client devices in a group.

13. The computer program product of claim 10, wherein the fragments used to create the multicast stream are selected based on a service provider policy applicable to one or more subscribers of client devices.

14. The computer program product of claim 10, wherein the multicast protocol is an unfragmented real time delivery protocol and the multicast stream is created in the unfragmented real time delivery protocol.

15. The computer program product of claim 10, wherein the multicast protocol is Internet Protocol Television (IPTV).

16. The computer program product of claim 10, wherein the multicast protocol is an over-the-air broadcast protocol.

17. A computer system comprising:
    one or more processors; and
    one or more non-transitory computer-readable storage mediums containing computer program instructions executed by the one or more processors for:
        encoding a video to produce a plurality of fragments in one or more adaptive bitrate formats;
        storing the plurality of fragments;
        receiving a request for content from a plurality of client devices;
        determining whether the plurality of client devices support adaptive bitrate streaming;
        responsive to determining that the plurality of client devices do not support adaptive bitrate streaming, creating a multicast stream from fragments from the plurality of fragments in a format supported by the plurality of client devices; and
        transmitting the multicast stream to the plurality of client devices according to a multicast protocol.

18. The system of claim 17, wherein the computer program instructions further for:
    creating a plurality of multicast streams from fragments from the plurality of fragments, each of the plurality of multicast streams in a format supported by a client device.

19. The system of claim 17, wherein the fragments used to create the multicast stream are selected based on available bandwidth of client devices in a group.

20. The system of claim 17, wherein the fragments used to create the multicast stream are selected based on a service provider policy applicable to one or more subscribers of client devices.

* * * * *